(12) United States Patent
Inao et al.

(10) Patent No.: US 10,166,937 B2
(45) Date of Patent: Jan. 1, 2019

(54) EXTERIOR MEMBER AND WIRE HARNESS

(71) Applicant: YAZAKI CORPORATION, Tokyo (JP)

(72) Inventors: Shinichi Inao, Shizuoka (JP); Hideomi Adachi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/377,356

(22) Filed: Dec. 13, 2016

(65) Prior Publication Data

US 2017/0166144 A1 Jun. 15, 2017

(30) Foreign Application Priority Data

Dec. 14, 2015 (JP) ................. 2015-242891

(51) Int. Cl.
*B60R 16/02* (2006.01)

(52) U.S. Cl.
CPC ................. *B60R 16/0215* (2013.01)

(58) Field of Classification Search
CPC .............................................. B60R 16/0215
See application file for complete search history.

(56) References Cited

U.S. PATENT DOCUMENTS

| | | | |
|---|---|---|---|
| 3,717,368 A * | 2/1973 | Czarnecki | E21B 17/0426 403/343 |
| 5,439,035 A | 8/1995 | Dal Palu Attilio | |
| 5,706,864 A * | 1/1998 | Pfleger | B32B 1/08 138/121 |
| 5,792,532 A * | 8/1998 | Pfleger | F16L 11/118 138/121 |
| 6,116,289 A * | 9/2000 | Hayashi | F16L 11/11 138/121 |

(Continued)

FOREIGN PATENT DOCUMENTS

| | | |
|---|---|---|
| CN | 103688431 A | 3/2014 |
| CN | 106356781 A | 1/2017 |

(Continued)

OTHER PUBLICATIONS

Japanese Office Action for the related Japanese Patent Application No. 2015-242891 dated Sep. 15, 2017.

(Continued)

*Primary Examiner* — William H Mayo, III
*Assistant Examiner* — Hiram E Gonzalez
(74) *Attorney, Agent, or Firm* — Kenealy Vaidya LLP (57) ABSTRACT

An exterior member includes a tubular body which allows one or more conductive paths to be stored and protected therein. The tubular body has no slit. The tubular body includes a plurality of protruding portions formed in an inner surface of the tubular body. Each of the plurality of protruding portions includes an R part having a substantially circular arc shape extending along a circumferential direction of an inner surface of the tubular body. Each of the plurality of protruding portions has a substantially U-shaped or V-shaped smooth surface in a cross-section cut along a tube axis of the tubular body. The plurality of protruding portions are disposed at positions on a helix around the tube axis.

9 Claims, 9 Drawing Sheets

(56) References Cited

U.S. PATENT DOCUMENTS

| | | | |
|---|---|---|---|
| 6,948,241 B2* | 9/2005 | Tadokoro | H02G 3/0468 |
| | | | 174/102 D |
| 2010/0045106 A1 | 2/2010 | Oga et al. | |
| 2014/0174784 A1 | 6/2014 | Ichikawa et al. | |
| 2016/0101747 A1 | 4/2016 | Inao et al. | |
| 2017/0015259 A1 | 1/2017 | Adachi et al. | |

FOREIGN PATENT DOCUMENTS

| | | |
|---|---|---|
| JP | 7-241925 A | 9/1995 |
| JP | 2007-312514 A | 11/2007 |
| JP | 2009-5422 A | 1/2009 |
| JP | 2010-47032 A | 3/2010 |
| JP | 2014-212615 A | 11/2014 |
| JP | 2015-6049 A | 1/2015 |

OTHER PUBLICATIONS

Chinese Office Action for the related Chinese Patent Application No. 201611154271.8 dated Oct. 18, 2018.

* cited by examiner

EXTERIOR MEMBER AND WIRE HARNESS

CROSS-REFERENCE TO RELATED APPLICATION(S)

This application is based on and claims priority from Japanese Patent Application (Application No. 2015-242891) filed on Dec. 14, 2015, the entire contents of which are incorporated herein by reference.

BACKGROUND

1. Field of the Invention

The present invention relates to an exterior member having a tube-like shape which allows a conductive path to be stored and protected therein, and a wire harness including the exterior member.

2. Description of Related Art

A high voltage wire harness will be described by way of example. For example, JP-A-2010-47032 discloses a wire harness for making electric connection between high voltage devices mounted on a hybrid car or an electric car. The wire harness disclosed in JP-A-2010-47032 by the present inventor includes one or plural conductive paths and a tube-like exterior member for protecting the one or plural conductive paths inserted thereto. The wire harness disclosed in JP-A-2010-47032 is long enough to be wired through the underfloor of a vehicle.

In the wire harness described in JP-A-2010-47032, each conductive path is fixed to a position of an end portion in the exterior member by taping. In addition, while the conductive path is inserted into the exterior member, the conductive path is also retained by protectors at front and rear positions in the underfloor of the vehicle. Even when the conductive path is fixed by the exterior member or the protectors, the conductive path is fixed to have a distance between its one end side and the other end side, and an intermediate portion of the conductive path is received with a gap between the conductive path and the exterior member. When vibration during running of a vehicle is transmitted to the conductive path in such a reception state, there is a fear that the conductive path may vibrate and hit on the inner surface of the exterior member. That is, there is a fear that shaving or the like may occur on the conductive path side.

In view of the above, the fear is resolved by using a wire harness described in JP-A-2014-212615. The wire harness described in JP-A-2014-212615 includes a corrugated tube formed to have a slit portion (that is, an external member is formed to have a slit). The corrugated tube is also formed to include an elastic lip part continuous with the slit portion so as to prevent vibration of the conductive path inserted through the slit portion. A tape is wrapped around the corrugated tube to cover the slit portion after insertion of the conductive path.

However, there are the following technical problems in the wire harness described in JP-A-2014-212615. One of the technical problems is that the wrap of tape is broken, for example, by the fly rock during driving of the vehicle, and water enters into the corrugated tube, for example, by splashed water, whereby failure is finally caused. Further, there is another technical problem that since the exterior member having the slit portion is used, necessary and sufficient stiffness can not be ensured.

SUMMARY

The present invention has been made in consideration of the above-described circumstances, and an object thereof is to provide an exterior member capable of ensuring necessary and sufficient stiffness and in no danger of water entry and also capable of suppressing a movement of a conductive path within the exterior member, and a wire harness including the exterior member.

A first aspect of the present invention provides an exterior member including: a tubular body which allows one or more conductive paths to be stored and protected therein, wherein the tubular body has no slit, wherein the tubular body includes a plurality of protruding portions formed in an inner surface of the tubular body, wherein each of the plurality of protruding portions includes an R part having a substantially circular arc shape extending along a circumferential direction of an inner surface of the tubular body, wherein each of the plurality of protruding portions is substantially U-shaped or V-shaped in a cross-section cut along a tube axis of the tubular body and has a smooth surface, and wherein the plurality of protruding portions are disposed at positions on a helix around the tube axis.

A second aspect of the present invention provides the exterior member according to the first aspect, wherein the tubular body includes a straight tube portion having a straight tubular shape, and wherein the plurality of protruding portions are formed in the straight tube portion.

A third aspect of the present invention provides a wire harness including: an exterior member including a tubular body; and one or more conductive paths stored and protected in the tubular body, wherein the tubular body has no slit, wherein the tubular body includes a plurality of protruding portions formed in an inner surface of the tubular body, wherein each of the plurality of protruding portions includes an R part having a substantially circular arc shape extending along a circumferential direction of an inner surface of the tubular body, wherein each of the plurality of protruding portions is substantially U-shaped or V-shaped in a cross-section cut along a tube axis of the tubular body and has a smooth surface, and wherein the plurality of protruding portions are disposed at positions on a helix around the tube axis.

According to the first aspect of the present invention, the plurality of protruding portions are disposed at positions which are on the helix around the tube axis and which are required to suppress movement of the conductive paths, the conductive paths can be prevented from moving easily, or the conductive paths can be held not to move. According to the first aspect of the present invention, there is an advantage that the movement of the conductive paths within the exterior member can be suppressed in a desired position so that shaving or the like on the conductive path side can be prevented. In addition, according to the first aspect of the present invention, the exterior member is formed into a shape with no slit. Thus, there is an advantage that waterproofness, dust resistance, etc. can be secured, so that adverse influence on the conductive paths can be eliminated. Further, according to the first aspect of the present invention, as described above, the plurality of protruding portions are disposed at the positions on the helix around the tube axis. Therefore, as compared with a structure, for example, in which the plurality of protruding portions are arrayed with predetermined intervals along a straight line, it is possible to prevent the exterior member from being easily bent or broken even when the exterior member is subjected to an external force applied from a direction perpendicular to the array. As a result, there is an advantage that reduction of stiffness can be prevented. In other words, there is an advantage that necessary and sufficient stiffness can be ensured. Further, each of the plurality of protruding portions is substantially U-shaped or V-shaped and has a smooth surface, whereby there is an advantage that the one or more conductive paths can be smoothly inserted.

According to the second aspect of the present invention, the plurality of protruding portions are formed in the straight tube portion. Therefore, there is an advantage that the movement of the conductive paths within the exterior member can be suppressed in a desired position in the straight tube portion. As a result, there is an advantage that the movement of the conductive paths within a long range such as a vehicle underfloor (within a range where vibration of the conductive paths easily occurs) can be suppressed so that shaving or the like on the conductive path side can be prevented.

According to the third aspect of the present invention, since the wire harness includes the exterior member according to the first or second aspect, the wire harness can also obtain advantages described above. Therefore, there is an advantage that it is possible to provide a more excellent wire harness.

BRIEF DESCRIPTION OF THE DRAWINGS

FIGS. 1A and 1B are views showing wire harnesses according to an embodiment of the present invention.

FIGS. 6A-6D are cross-sectional views of the external member shown in FIG. 3.

FIGS. 7A-7D are cross-sectional views of the external member shown in FIG. 3.

DETAILED DESCRIPTION

A wire harness includes an exterior member including a tubular body, and a conductive path stored and protected in the tubular body. The tubular body has no slit. The tubular body includes a plurality of protruding portions formed in, for example, a middle portion of, an inner surface of the tubular body. Each of the plurality of protruding portions is formed in a portion extending along a circumferential direction of an inner surface of the tubular body to have a substantially circular arc shape. Specifically, an R part is formed as the portion extending along the circumferential direction of the inner surface of the tubular body to have the substantially circular arc shape. Each of the plurality of protruding portions is substantially U-shaped or V-shaped in a cross-section cut along a tube axis of the tubular body and has a smooth surface. The plurality of protruding portions are disposed at positions on a helix around the tube axis.

Figure 1A:
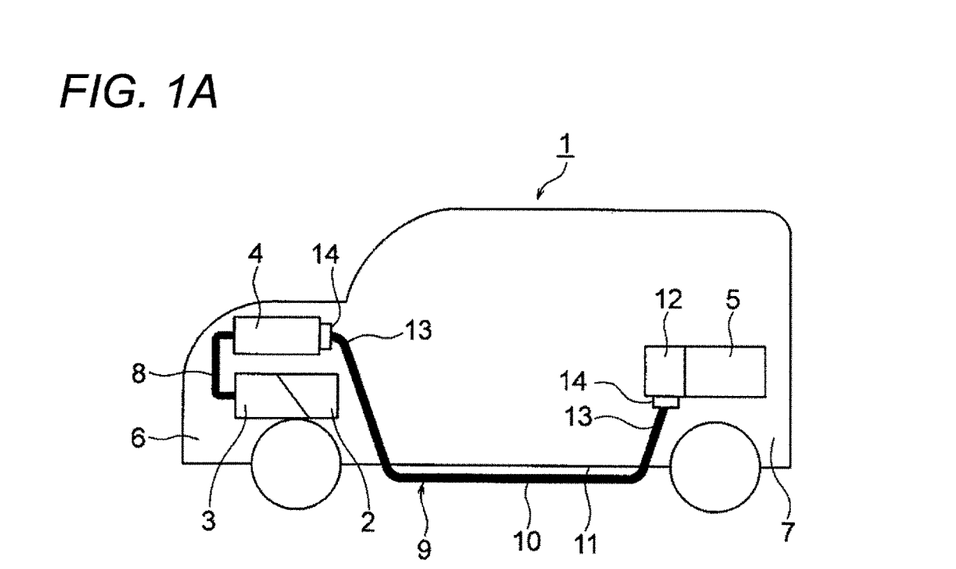
FIG. 1A is a schematic view showing a wiring state of a high voltage wire harness and FIG. 1B is a schematic view showing a wiring state of another low voltage wire harness.
Figure 1B:
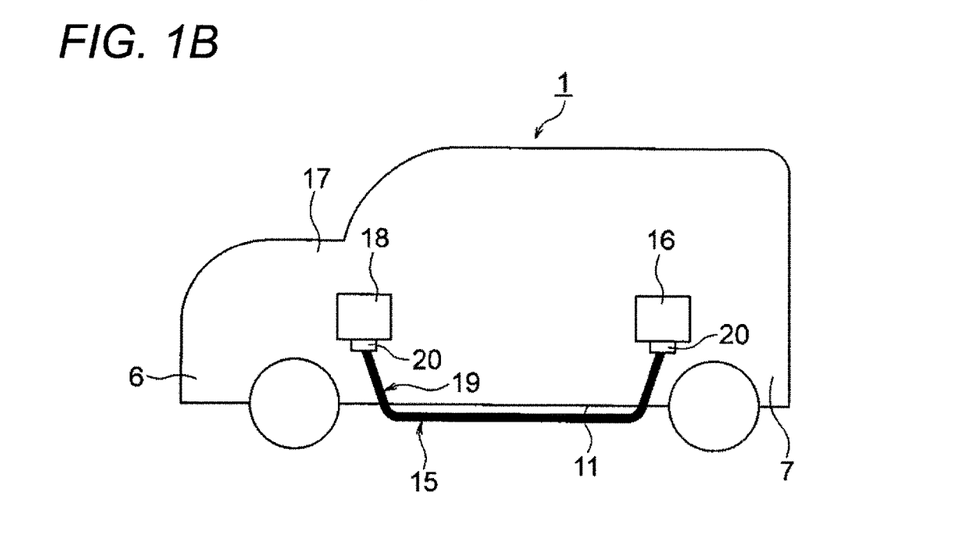
Figure 2:
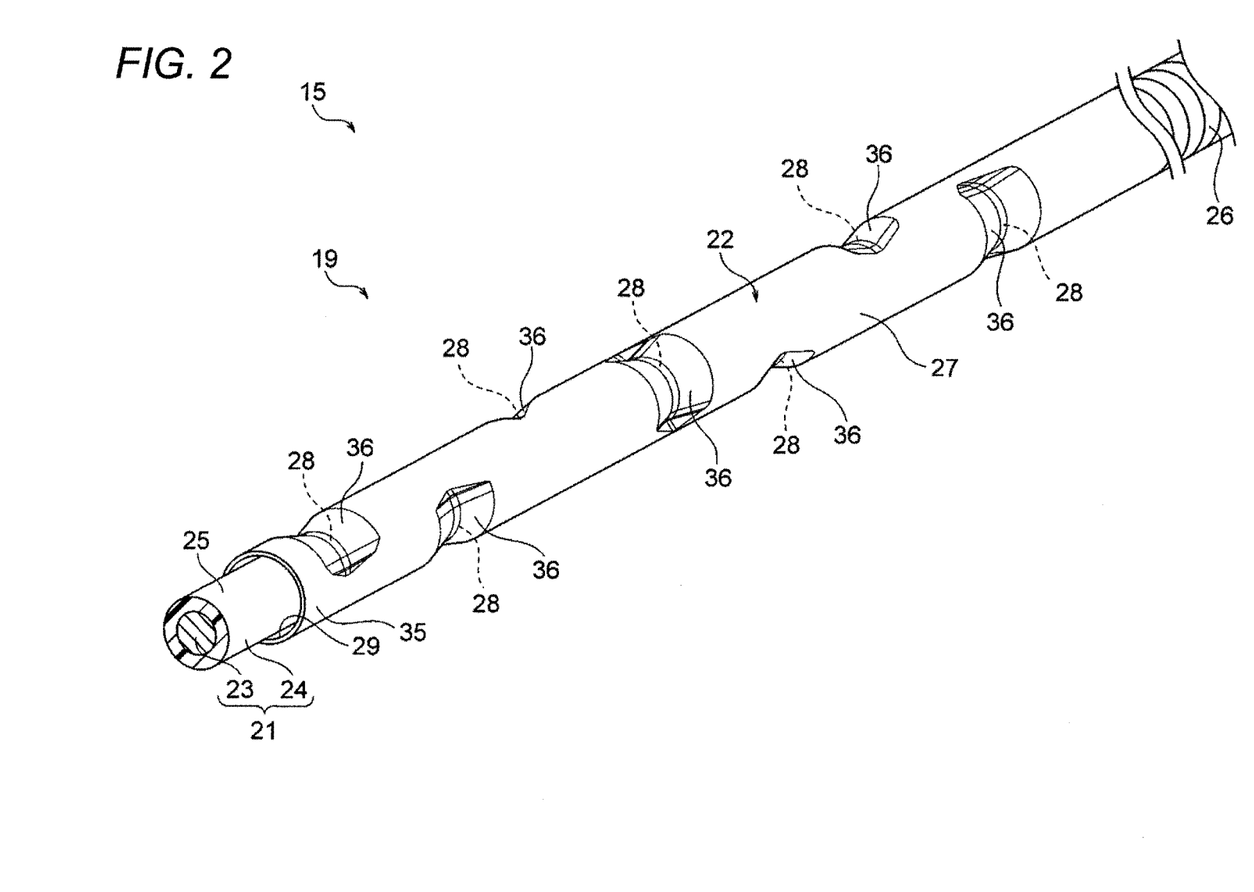
FIG. 2 is a perspective view showing an external member according to the embodiment of the present invention and the wire harness.
Figure 3:
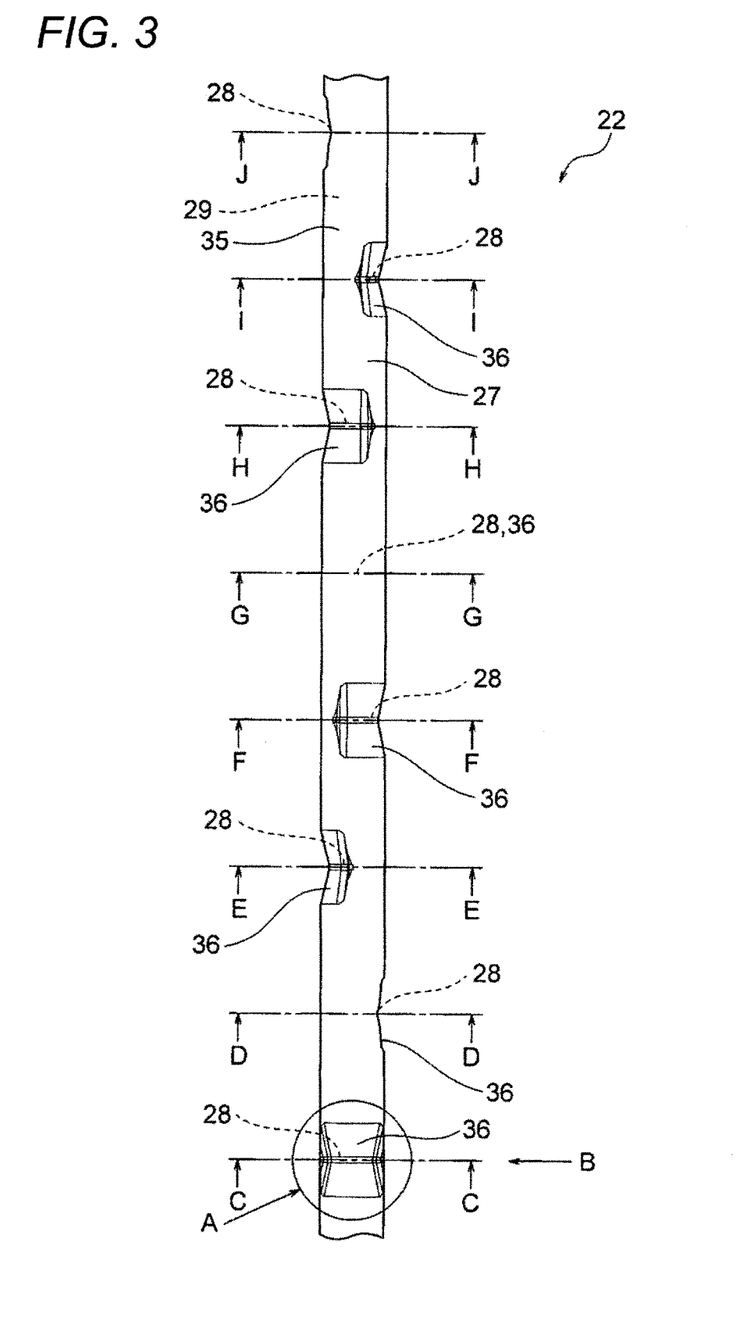
FIG. 3 is a plan view of the eternal member shown in FIG. 2.
Figure 4:
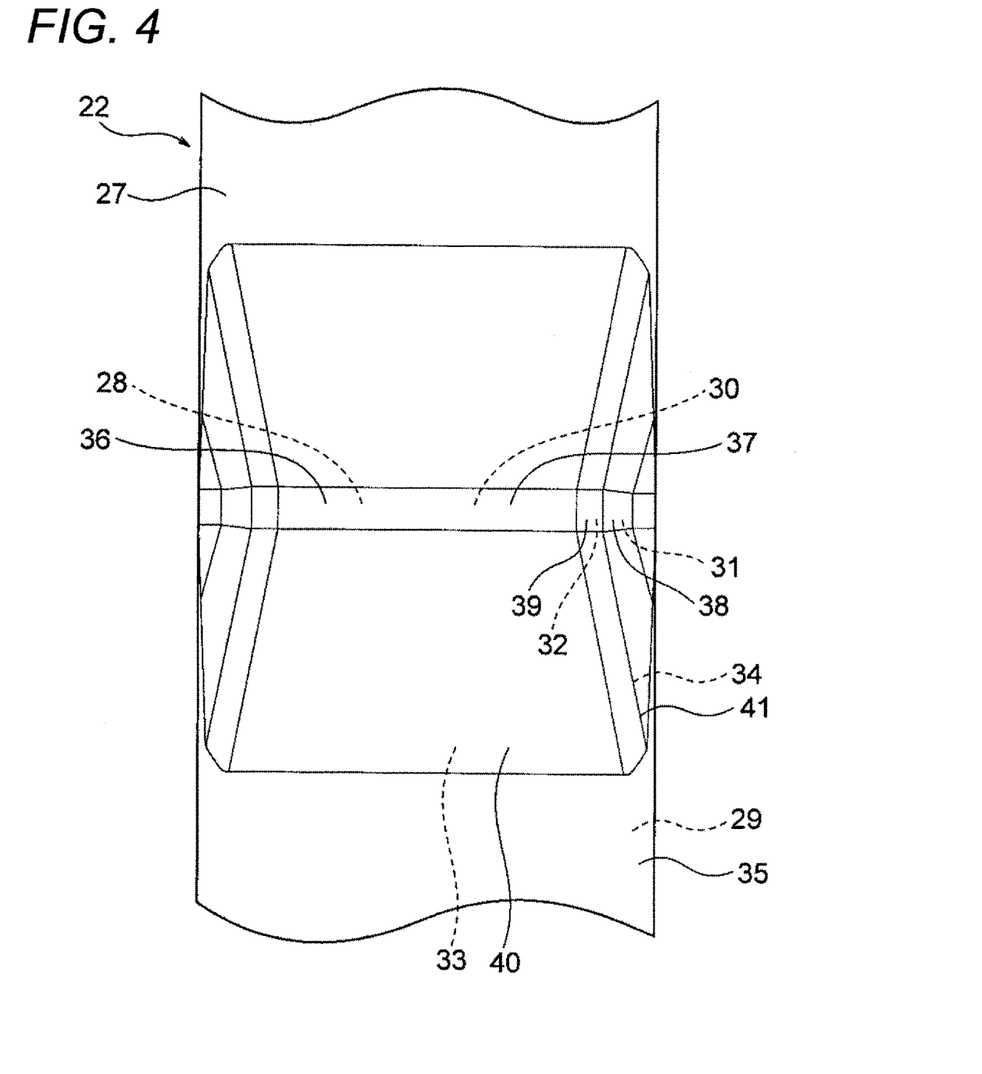
FIG. 4 is an enlarged view of a portion indicated by an arrow A of the external member shown in FIG. 3.
Figure 5:
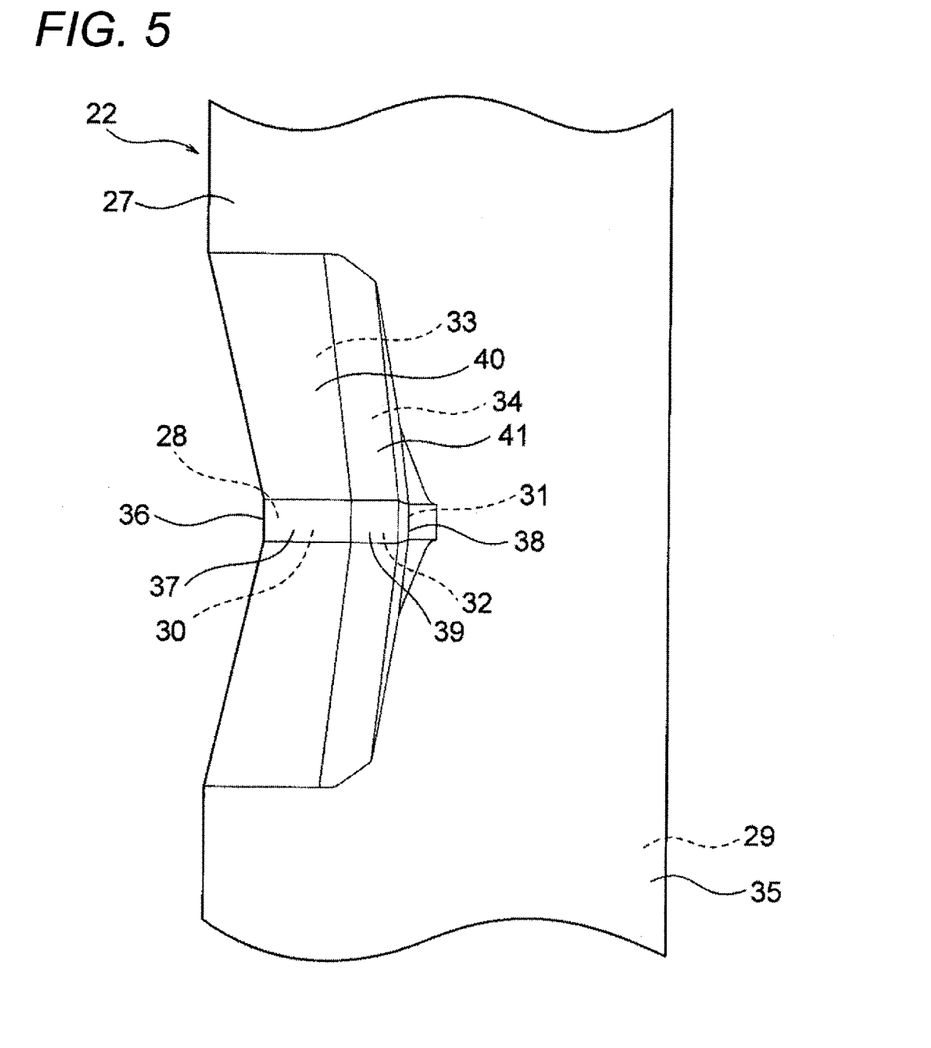
FIG. 5 is an enlarged view of a portion indicated by an arrow B of the external member shown in FIG. 3.
Figure 6A:
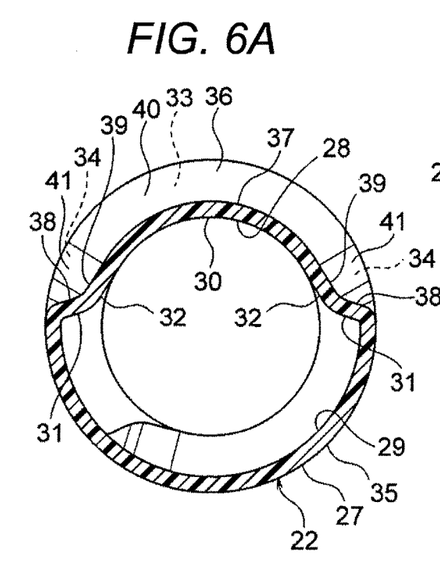
FIG. 6A shows a cross-sectional view cut along a line C-C shown in FIG. 3.
Figure 6B:
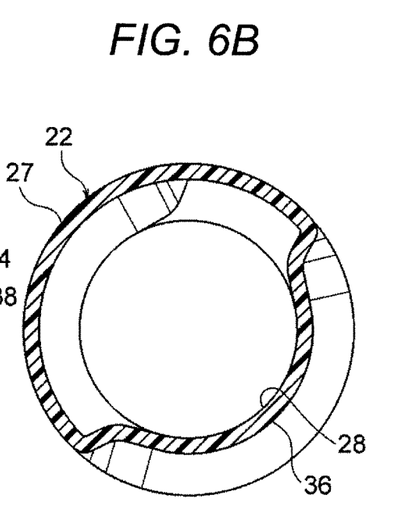
FIG. 6B shows a cross-sectional view cut along a line D-D shown in FIG. 3.
Figure 6C:
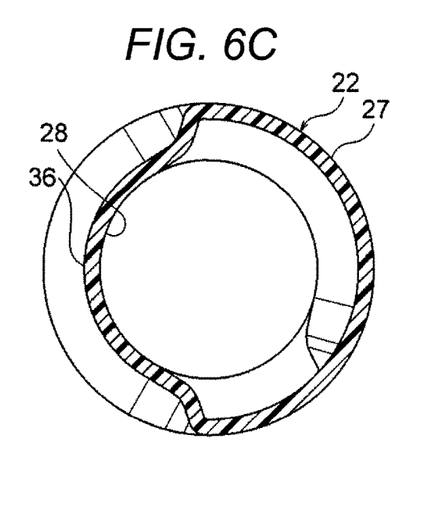
FIG. 6C shows a cross-sectional view cut along a line E-E shown in FIG. 3.
Figure 6D:
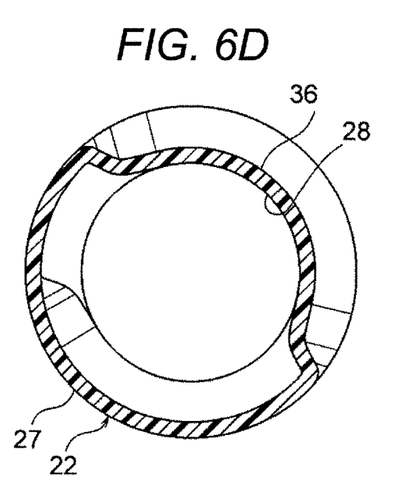
FIG. 6D shows a cross-sectional view cut along a line F-F shown in FIG. 3.
Figure 7A:
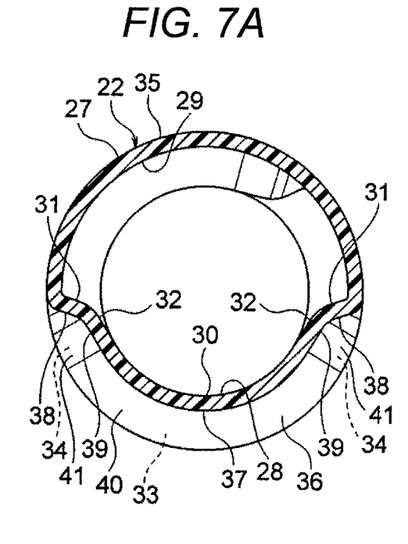
FIG. 7A shows a cross-sectional view cut along a line G-G shown in FIG. 3.
Figure 7B:
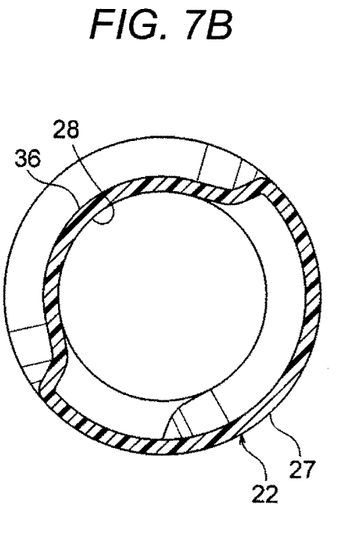
FIG. 7B shows a cross-sectional view cut along a line H-H shown in FIG. 3.
Figure 7C:
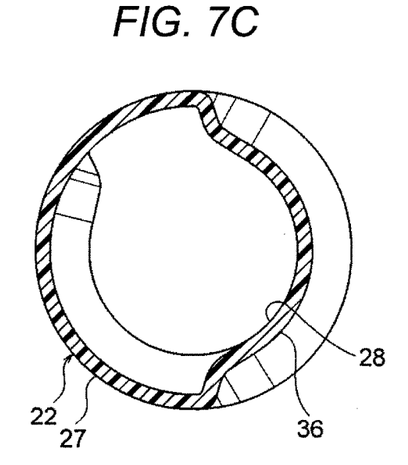
FIG. 7C shows a cross-sectional view cut along a line I-I shown in FIG. 3.
Figure 7D:
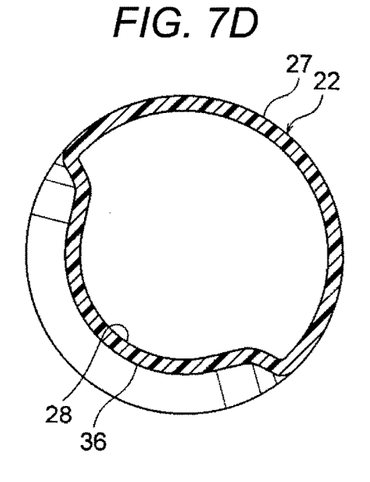
FIG. 7D shows a cross-sectional view cut along a line J-J shown in FIG. 3.
Figure 8:
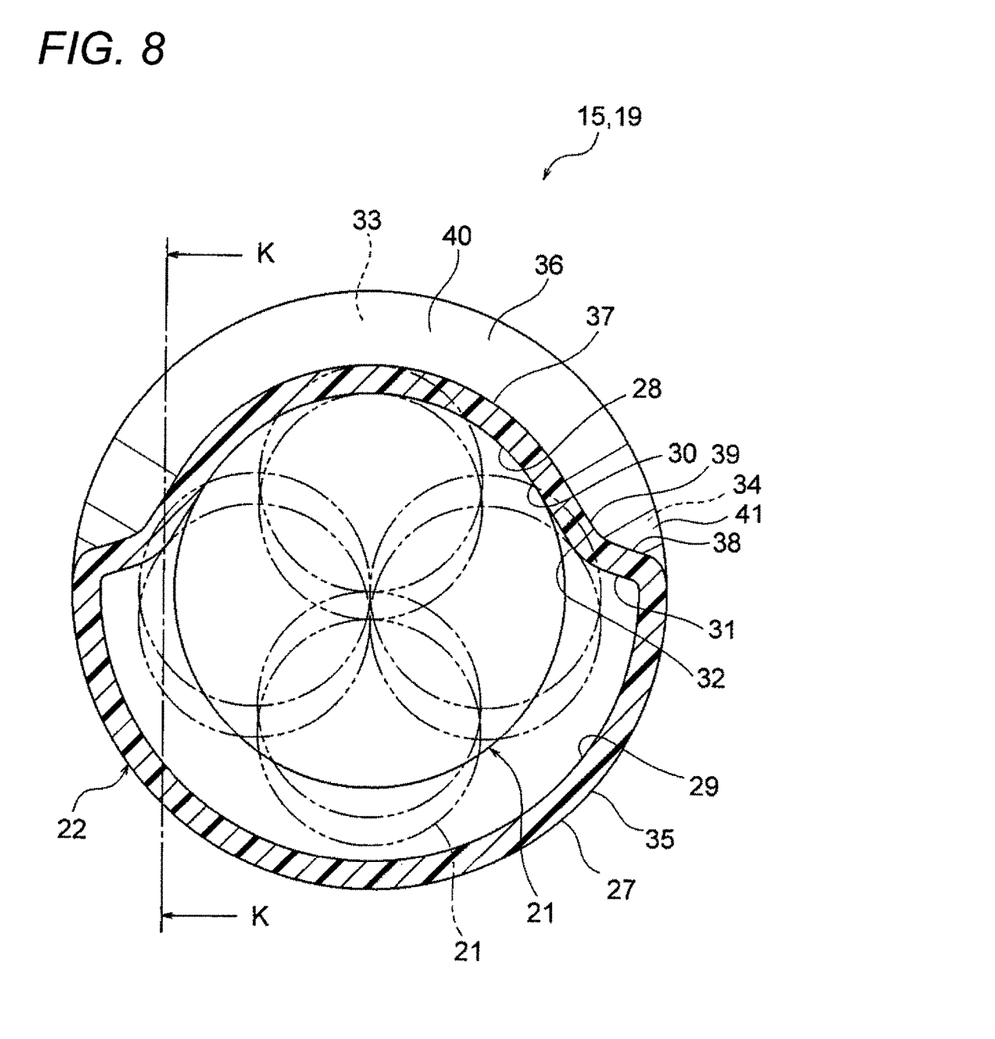
FIG. 8 is a cross sectional view showing a state of the external member and conductive paths cut along the line C-C shown in FIG. 3.
Figure 9:
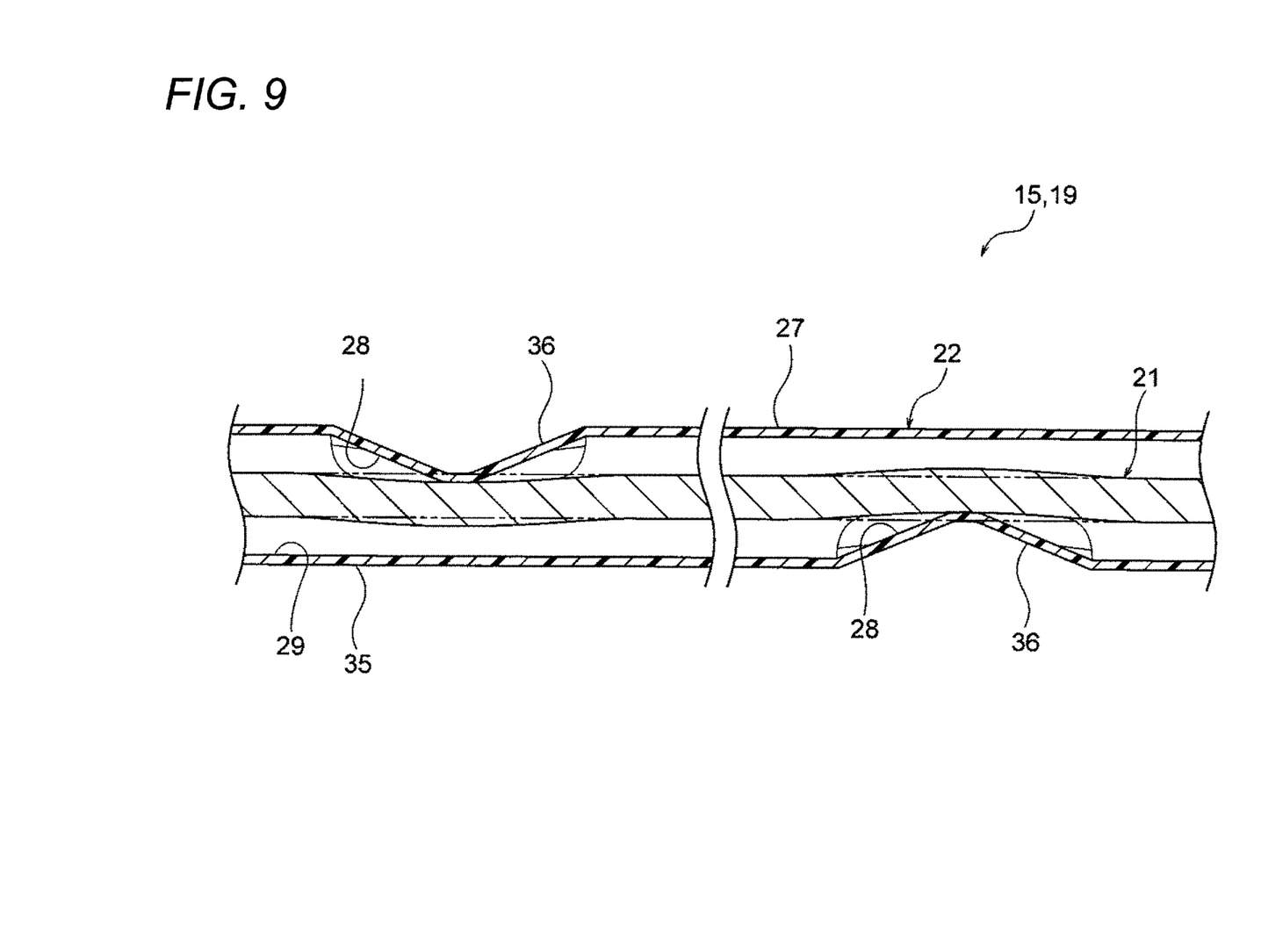
FIG. 9 is a cross sectional view cut along the line K-K shown in FIG. 8.

An embodiment of the present invention is described with reference to the drawings. FIGS. 1A and 1B are views showing wire harnesses according to an embodiment of the present invention. FIG. 1A is a schematic view showing a wiring state of a high voltage wire harness and FIG. 1B is a schematic view showing a wiring state of another low voltage wire harness. FIG. 2 is a perspective view showing an external member according to the embodiment of the present invention and the wire harness. FIG. 3 is a plan view of the eternal member shown in FIG. 2. FIGS. 4 and 5 are enlarged views of portions indicated by an arrow A and an arrow B of the external member shown in FIG. 3, respectively. FIGS. 6A-6D and FIGS. 7A-7D are cross-sectional views of the external member shown in FIG. 3. FIG. 8 is a cross sectional view showing a state of the external member and conductive paths cut along the line C-C shown in FIG. 3. FIG. 9 is a cross sectional view cut along the line K-K shown in FIG. 8.

In the embodiment, the present invention is applied, for example, to a wire harness wired in a hybrid car (which may be replaced by an electric car or a general car).

<Configuration of Hybrid Car 1>

In FIG. 1A, the reference numeral 1 represents a hybrid car. The hybrid car 1 is a vehicle that is driven by a mixture of two power sources, that is, an engine 2 and a motor unit 3. To the motor unit 3, electric power is supplied from a battery 5 (or a battery pack) through an inverter unit 4. In this embodiment, the engine 2, the motor unit 3 and the inverter unit 4 are mounted in an engine room 6 located where there are front wheels etc. On the other hand, the battery 5 is mounted in a car rear portion 7 located where there are rear wheels etc. (the battery 5 may be mounted in a car cabin that is located at the rear of the engine room 6).

The motor unit 3 and the inverter unit 4 are connected through a high voltage wire harness 8 (a motor cable for high voltage). In addition, the battery 5 and the inverter unit 4 are also connected through a high voltage wire harness 9. An intermediate portion 10 of the wire harness 9 is wired in an vehicle underfloor 11 (in a vehicle body). In addition, the intermediate portion 10 is wired substantially in parallel with the vehicle underfloor 11. The vehicle underfloor 11 is a well-known body (vehicle body) that is a so-called panel member. Through holes are formed in predetermined positions of the vehicle underfloor 11. The wire harness 9 is watertightly inserted into one of the through holes.

The wire harness 9 and the battery 5 are connected through a junction block (distribution block) 12 that is provided in the battery 5. An external connection unit such as a shielded connector disposed at a harness terminal 13 on the rear end side of the wire harness 9 is electrically connected to the junction block 12. On the other hand, the wire harness 9 and the inverter unit 4 are electrically connected through an external connection unit such as a shielded connector disposed at a harness terminal 13 on the front end side.

The motor unit 3 includes a motor and a generator. On the other hand, the inverter unit 4 includes an inverter and a converter. The motor unit 3 is formed as a motor assembly including a shield case. The inverter unit 4 is also formed as an inverter assembly including a shield case. The battery 5 is a modularized one based on Ni-MH or Li-ion. For example, an electric storage device such as a capacitor may be used. Not to say, the battery 5 is not limited especially as long as it can be used in the hybrid car 1 or an electric car.

In FIG. 1B, the reference numeral 15 represents a wire harness. The wire harness 15 is a low voltage one (for low voltage), which is provided for electrically connecting a low voltage battery 16 in the car rear portion 7 in the hybrid car 1 with an accessary 18 (apparatus) mounted on the vehicle front portion 17. The wire harness 15 is wired through the vehicle underfloor 11 in the same manner as the wire harness 9 in FIG. 1A (this is an exemplar, but the wire harness 15 may be wired through the vehicle cabin side).

As shown in FIGS. 1A and 1B, the high voltage wire harnesses 8 and 9 and the low voltage wire harness 15 are wired in the hybrid car 1. Although the present invention can be applied to any wire harness, the low voltage wire harness 15 will be described below by way of typical example.

<Configuration of Wire Harness 15>

In FIG. 1B, the wire harness 15 long enough to be wired through the vehicle underfloor 11 includes a harness body 19, and connectors 20 (external connection units) disposed at opposite ends of the harness body 19 respectively. In addition, the wire harness 15 also has fixation members (such as clamps) and not-shown water stop members (such as grommets) in its configuration. The fixation members are provided for wiring the wire harness 15 in a predetermined position.

<Configuration of Harness Body 19>

In FIG. 2, the harness body 19 includes a conductive path 21, and an exterior member 22 according to the embodiment of the present invention for receiving and protecting the conductive path 21. The number of conductive path 21 is one in FIG. 2, but this is an exemplar. That is, the number of conductive paths may be plural as shown in FIG. 8. As for the configuration and structure of the exterior member 22, one which can receive and protect the high voltage wire harness 9 together may be used. The conductive path 21 in the harness body 19 will be described first, and the exterior member 22 according to the embodiment the present invention will be described the next.

<Conductive Path 21>

The conductive path 21 includes a conductor 23 with electric conductivity, and an insulator 24 with insulating properties. The conductor 23 is coated with the insulator 24. The conductor 23 is formed out of copper, a copper alloy, aluminum, or an aluminum alloy and into a circular shape in section. The conductor 23 may have a conductor structure that includes twisted strands or a rod-like conductor structure that is rectangular or circular (round) in section (for example, a conductor structure that serves as a rectangular single core or a circular single core. In this case, an electric wire itself also has a rod-like shape). The insulator 24 made of an insulating resin material is formed on the outer surface of the conductor 23 by extrusion molding.

The insulator 24 is formed out of a thermoplastic resin material and on the outer circumferential surface of the conductor 23 by extrusion molding. The insulator 24 is formed as a coating having a circular shape in section. The insulator 24 is formed with a predetermined thickness. Various well-known kinds of resins may be used as the thermoplastic resin. For example, a suitable one may be selected from polymeric materials such as polyvinyl chloride resin, polyethylene resin, polypropylene resin, etc. A reference number 25 refers to an outer peripheral surface of the conductive path 21 (here, an outer peripheral surface of the insulator 24).

<Exterior Member 22>

As shown in FIGS. 2 and 3, the exterior member 22 is formed into a shape like a single straight tube by resin molding (the exterior member 22 is straight before use. Incidentally, assume that the exterior member 22 is not limited to a resin one but may be a metal one). In other words, the exterior member 22 includes or formed by a tubular body. In addition, the exterior member 22 is formed into a shape having no slit. To say other words, the exterior member 22 is formed into a shape with no slit (or formed into a shape that is not a divided tube). The exterior member 22 is formed to have a circular shape in cross section. In the embodiment, the cross-sectional shape is a true circular shape as an example, but may be oval, ellipse, rectangle, etc.

The exterior member 22 includes a plurality of flexible tube portions 26 with flexibility and a plurality of straight tube portions 27 serving as parts where the conductive path 21 are wired straightly. The flexible tube portions 26 and the straight tube portions 27 are formed and disposed alternately.

<Flexible Portion 26>

As shown in FIG. 2, the flexible tube portions 26 are disposed in accordance with the shape of attachment to a vehicle (the shape of a destination where the wire harness should be wired, or the shape of a fixing target). In addition, the flexible tube portions 26 are formed to be long in accordance with the shape of attachment to the vehicle. The flexible tube portions 26 do not have fixed lengths, but are formed in lengths required in accordance with the shape of attachment to the vehicle respectively. The flexible tube portions 26 are formed at portions so as to be bent at desired angles respectively under a packed state of the wire harness 15, during transportation of the wire harness 15 and during wiring path arrangement on the vehicle. That is, the flexible tube portions 26 are formed at portions where they can be bent into curved shapes and they can be also naturally resumed to their original straight states (states at the time of resin molding) as illustrated.

In the embodiment, each flexible tube portion 26 is formed into a bellows tube shape (the shape is not limited especially as long as it has flexibility). Specifically, the flexible tube portion 26 is formed to have bellows recess portions and bellows protruding portions extending circumferentially so that the bellows recess portions and the bellows protruding portions can extend continuously and alternately in the tube axis direction.

<Straight Tube Portion 27>

As shown in FIGS. 2 and 3, the straight tube portions 27 are formed as parts that are not as flexible as the flexible tube portions 26. In addition, the straight tube portions 27 are also formed as parts that cannot be bent under the packed state, during the transportation and during the wiring path arrangement (The parts that cannot be bent means parts that are not aggressively provided with flexibility). The illustrated straight tube portions 27 are formed into long and straight tube shapes.

The straight tube portions 27 are formed for rigid parts in comparison with the flexible tube portions 26. The straight tube portions 27 are formed in positions or lengths corresponding to the shape of attachment to the vehicle. In the embodiment, the straight tube portions 27 are formed at least as parts to be disposed in the vehicle underfloor 11 (see FIGS. 1A and 1B). A plurality of protruding portions 28, which are characteristic parts of the embodiment of the present invention, are formed integrally with a part or whole of each straight tube portion 27.

<A Plurality of Protruding Portions 28>

As shown in FIGS. 2 to 9, the plurality of protruding portions 28 are formed to protrude inward from an inner surface 29 of the straight tube portion 27. Each of the protruding portions 28 has a substantially circular arc shape extending along a circumferential direction of the inner surface 29. The protruding portions 28 are disposed at position on a helix around the tube axis. The term "circumferential direction of the inner surface 29) may refer to a circumference direction on a plane perpendicular to the tube axis or may be a circumference direction on a plane obliquely intersecting with the tube axis.

The protruding portion 28 is formed as shown in the drawings to include: an R part 30 having a substantially circular arc shape extending in the circumferential direction of the inner surface 29; oblique side parts 31 each having an oblique side shape and continuous with the inner surface 29 from both ends of the R part 30; tapered parts 32 formed at positions connecting the R part 30 and the oblique side parts 31; oblique surface parts 33 for guiding the conductive path 21 which are continuous with the inner surface 29 and obliquely extend from a top portion of the R part 30; and connection oblique surface parts 34, each of which connects the oblique side part 31, the tapered part 32, the oblique surface part 33, and the inner surface 29. The protruding portion 28 is substantially U-shaped or V-shaped in a cross-section cut along the tube axis and has a smooth surface. The protruding portion 28 is formed to extend in the circumference direction of the inner surface 29 so as to be equal to or smaller than a length of a semicircle of the inner surface 29.

The tapered part 32 is formed as a part for allowing smooth insertion of the conductive path 21. The tapered part 32 may be formed optionally.

As shown in FIGS. 4 and 5, the straight tube portion 27 includes a plurality of recess portions 36 formed on an outer surface 35 of the straight tube portion 27. The recess portions 36 are formed as recesses caused by the protruding portions 28. The recess portion 36 is formed as shown in the drawings to includes: an R groove part 37 including a bottom on having a substantially circular arc shape in a circumferential direction of the outer surface 35; oblique side parts 38 each continuous with the outer surface 35 from both ends of the R groove part 37; tapered parts 39 formed at positions connecting the R groove part 37 and the oblique side parts 38; oblique surface parts 40 which are continuous with the outer surface 35 and obliquely extend from the R groove part 37; and connection oblique surface parts 41, each of which connects the oblique side part 38, the tapered part 39, the oblique surface part 40, and the outer surface 35.

Although not shown, the exterior member 22 is formed by resin, for example, by using a known extruder and a mold having a plurality of protruding portions formed in an inner surface of the mold. Specifically, the exterior member 22 is formed by a method in which a tubular extruded product extruded from a nozzle of the extruder is pressed against the protruding portions formed in the inner surface of the mold or is subjected to vacuum suction. The plurality of protruding portions 28 and resulting recess portions 36 are formed by the protruding portions formed in the inner surface of the mold.

Effects of Embodiment

In the configuration and structure as described above, the plurality of protruding portions 28 are formed in the inner surface 29 of the exterior member 22. Therefore, during insertion of the conductive path 21 from an opening at one end of the exterior member 22 toward an opening at the other end thereof, the conductive path 21 moves while changing its moving direction to a part where the protruding portions 28 do not exist. Thereafter, in a state in which the conductive path 21 is completely stored and protected in the external member 22 (see FIGS. 2 and 9), the conductive path 21 is held by the plurality of protruding portions 28.

Conclusion and Advantages

As described above with reference to FIGS. 1 to 9, the harness body 19 of the wire harness 15 includes an exterior member 22 including a tubular body, and a conductive path 21 inserted through the exterior member 22. The exterior member 22 has no slit. The exterior member 22 includes a plurality of protruding portions 28 formed in the inner surface 29 of the straight tube portion 27 of the exterior member 22. Each of the plurality of protruding portions 28 is formed in a portion extending along a circumferential direction of the inner surface 29 to have a substantially circular arc shape. Specifically, the R part 30 is formed as the portion extending along the circumferential direction of the inner surface 29 to have the substantially circular arc shape. Each of the plurality of protruding portions 28 is substantially U-shaped or V-shaped in a cross-section cut along the tube axis and has a smooth surface. The plurality of protruding portions are disposed at positions on a helix around the tube axis. The plurality of protruding portions 28 can make the conductive path 21 move easily or can hold and prevent the conductive path 21 from moving.

Thus, according to the exterior member 22 and the wire harness 15 of the embodiment of the present invention, there is an advantage that the movement of the three conductive path 21 within the exterior member 22 can be suppressed at a desired position, so that shaving or the like on the conductive path 21 side can be prevented. In addition, according to the exterior member 22 and the wire harness 15 of the embodiment of the present invention, the exterior member 22 is formed into a shape with no slit. Thus, there is an effect that waterproofness, dust resistance, etc. can be secured, so that adverse influence on the conductive path 21 can be eliminated.

Further, according to the exterior member 22 and the wire harness 15 of the embodiment of the present invention, the plurality of protruding portions 28 are disposed at the positions on the helix around the tube axis. Therefore, as compared with a structure, for example, in which the plurality of protruding portions 28 would be arrayed with predetermined intervals along a straight line, it is possible to prevent the exterior member 28 from being easily bent or broken even when the exterior member 28 is subjected to an external force applied from a direction perpendicular to the array. As a result, there is an advantage that reduction of stiffness can be prevented. In other words, there is an advantage that necessary and sufficient stiffness can be ensured.

Further, according to the exterior member 22 and the wire harness 15 of the embodiment of the present invention, each of the plurality of protruding portions 28 is substantially U-shaped or V-shaped and has a smooth surface, whereby there is an advantage that the conductive path 21 can be smoothly inserted into the exterior member 22. Therefore, there is an advantage of enhanced workability.

It is a matter of course that various changes may be made on the present invention without departing from the scope of the present invention.

What is claimed is:

1. An exterior member comprising:
a tubular body which allows one or more conductive paths to be stored and protected therein,
wherein the tubular body has no slit,
wherein the tubular body comprises a plurality of protruding portions formed in an inner surface of the tubular body,
wherein each of the plurality of protruding portions comprises an arc part having a substantially circular arc shape extending along a circumferential direction of the inner surface of the tubular body,
wherein each of the plurality of protruding portions is substantially U-shaped or V-shaped in a cross-section cut along a tube axis of the tubular body and has a smooth surface,
wherein the plurality of protruding portions are disposed at positions on a helix around the tube axis, and
wherein the plurality of protruding portions are formed in portions of the inner surface where the conductive path moves while changing its moving direction to a part where the protruding portions do not exist.

2. The exterior member according to claim 1,
wherein the tubular body comprises a straight tube portion having a non-corrugated straight tubular shape, and
wherein the plurality of protruding portions are formed in the straight tube portion.

3. The exterior member of claim 1, wherein
each of the protruding portions is disposed at a different longitudinal position along the tube axis.

4. The exterior member according to claim 1, wherein
the substantially circular arc shape of the arc part is convex outward in a radial direction of the tubular body so as to follow along an outer surface of each of the conductive paths in the circumferential direction.

5. The exterior member according to claim 1, wherein
the plurality of protruding portions are disposed at non-uniform positions spaced along the same helix around the tube axis.

6. A wire harness comprising:
an exterior member comprising a tubular body; and
one or more conductive paths stored and protected in the tubular body,
wherein the tubular body has no slit,
wherein the tubular body comprises a plurality of protruding portions formed in an inner surface of the tubular body,
wherein each of the plurality of protruding portions comprises an arc part having a substantially circular arc shape extending along a circumferential direction of the inner surface of the tubular body,
wherein each of the plurality of protruding portions is substantially U-shaped or V-shaped in a cross-section cut along a tube axis of the tubular body and has a smooth surface,
wherein the plurality of protruding portions are disposed at positions on a helix around the tube axis, and
wherein the plurality of protruding portions are formed in portions of the inner surface where the conductive path moves while changing its moving direction to a part where the protruding portions do not exist.

7. The wire harness of claim 6, wherein
each of the protruding portions is disposed at a different longitudinal position along the tube axis.

8. The wire harness according to claim 6, wherein
the substantially circular arc shape of the arc part is convex outward in a radial direction of the tubular body so as to follow along an outer surface of each of the conductive paths in the circumferential direction.

9. The wire harness according to claim 6, wherein
the plurality of protruding portions are disposed at non-uniform positions spaced along the same helix around the tube axis.

* * * * *